United States Patent [19]

Baus, Jr.

[11] Patent Number: 4,797,767
[45] Date of Patent: Jan. 10, 1989

[54] DIGITAL MAGNETIC HEAD STRUCTURE

[75] Inventor: Rene Baus, Jr., Palos Verdes, Calif.

[73] Assignee: American Magnetics Corporation, Carson, Calif.

[21] Appl. No.: 933,075

[22] Filed: Nov. 20, 1986

[51] Int. Cl.4 .................. G11B 5/265; G11B 5/29; G11B 5/127
[52] U.S. Cl. .................. 360/121; 360/125; 360/122; 360/120; 360/126; 29/603
[58] Field of Search .............. 360/125, 121, 119, 120, 360/126, 127, 129, 122; 29/603

[56] References Cited

U.S. PATENT DOCUMENTS

| | | | |
|---|---|---|---|
| 3,414,971 | 12/1968 | Boehme | 360/125 |
| 4,366,518 | 12/1982 | Chow et al. | 360/125 |
| 4,494,160 | 1/1985 | Bakker | 360/125 |
| 4,559,572 | 12/1985 | Kumasaka et al. | 360/125 |

FOREIGN PATENT DOCUMENTS

| | | | |
|---|---|---|---|
| 965869 | 4/1975 | Canada | 360/121 |
| 58-80115 | 5/1983 | Japan | 360/125 |
| 59-5412 | 1/1984 | Japan | 29/603 |

Primary Examiner—John H. Wolff
Assistant Examiner—Matthew J. Bussan
Attorney, Agent, or Firm—Stanger, Michaelson, Reynolds, Spivak & Tobia

[57] ABSTRACT

A method for fabricating a write-after-read magnetic head assembly employs rectangular wafers sliced from a block of abrasion-resistive material. The block is prepared, prior to slicing, with pairs of opposed slots extending inwardly from anterior and posterior surfaces. The slots are adapted to include inserts of magnetically soft material. The inserts at the anterior surface also are of high cost abrasion-resistive materials necessary for digital recording systems but represent a relatively tiny amount of such materials. Pairs of wafers are juxtaposed in a manner to form a core equivalent structure and two such wafer pairs are mounted in an assembly which defines write after read heads for two tracks in a manner to preserve aximuth and avoid feed.

9 Claims, 4 Drawing Sheets

DIGITAL MAGNETIC HEAD STRUCTURE

FIELD OF THE INVENTION

This invention relates to magnetic head structures and more particularly to multiple head structures which are wear resistant and adapted to withstand high density tape recording media which are made of abrasive materials.

BACKGROUND OF THE INVENTION

Magnetic heads adapted for use with tape cartridges are well known. Such heads are composed of metals where minimum practicable gap size is limited to forty microinches. Consequently, metallic head structures are excluded from use with cartridges with tapes having more than 12,000 flux reversals per inch. The prime reason for this is that the metallic heads become rounded with use causing degradation in performance. Such degradation is not avoided by use of conventional harder materials such as mumetal or metglass which are relatively inexpensive. Ferrite composite materials which are sufficiently hard to avoid such wear are too costly and difficult to work with during manufacture.

The problem of wear resistance is particularly acute with video cassette recorders (VCR's) which employ chromium dioxide tapes which are highly abrasive. VCR's use ferrite heads which are elevated from the tape surface (flying) during operation thus avoiding abrasion. In digital recording apparatus, the head is in contact with the tape. The wear resistance problem in digital recording apparatus is overcome by the use of ferrite composite heads of calcium and barium titanate. Another solution is a thin film head in a substrate of, for example, titanium and aluminum oxide or tungsten carbide. These alternatives are expensive. Still another solution to the wear resistance problem is to provide the metal heads with a ceramic coating. A narrow window is provided in the ceramic to expose the core. Such structures are plagued with undercutting which causes the core to become irregular and exhibit signal degradation.

In general the wear problem in tape heads is largely solved by the use of ferrite composite heads. But, ferrite composite heads with separate read and write core structures (for read-while-write applications) have another problem: high cross feed between the write and read core structures, which leads to uunacceptable error levels. For this reason, ferrite composite heads have been limited to a single gap operation whereby the entire tape is first written and then is read during a second pass of the tape to verify the accuracy of the written data. This double pass is time consuming, inefficient in tape storage density, and requires a considerable storage overhead of error correction codes. Whereas two separate passes are acceptable for low capacity storage devices (e.g., a floppy disk with 340 KB storage), two passes are unacceptable for high capacity drives (e.g., those that store 20 MB to 500 MB such as the 3M cartridges and the IBM 3480 cartridges).

The magnetic head structure of this invention makes possible the construction of read-while-write ferrite composite heads having separate read and write core structures on the same tape track. Cross feed is acceptably low; azimuth errors (which plague conventional ferrite head structures) are overcome; and the structure of this invention lends itself to automatic production and thus low manufacturing cost. In this connection, azimuth errors occur when adjacent gaps lie in planes which are not parallel to one another.

BRIEF DESCRIPTION OF AN ILLUSTRATIVE EMBODIMENT OF THE INVENTION

In accordance with the principles of the present invention, a multigap magnetic head structure is provided which eliminates cross feed and provides a wear resistant contact surface adapted for high density tapes while using only very small quantities of expensive wear resistant materials.

In one embodiment, a magnetic head herein is fabricated from two of generally parallelopiped structures of prescribed shapes designed for stacking in a manner to maintain parallel surfaces (azimuth) accurately. First and major surfaces of the structures are abutted against one another in a manner to define a gap. Each structure includes spaced apart portions of magnetic materials in positions to define portions of a magnetic path. Flux closure paths are defined by C-shaped and bar-shaped magnetic elements which bridge the spaced apart portions of magnetic materials and drive coils are wound about the flux closure-defining elements.

First and second pairs of stacked structures (called wafers hereinafter) are separated by a ferrite block sandwiched between conductive metal, generally parallelopiped structures adapted to receive the stacked gap-defining structures. The entire assembly is enclosed in a metallic enclosure or can designed to provide a single conductive loop about each of the resulting heads in order to eliminate crossfeed between the gap-defining wafers.

DETAILED DESCRIPTION OF AN ILLUSTRATIVE EMBODIMENT

Figure 1:
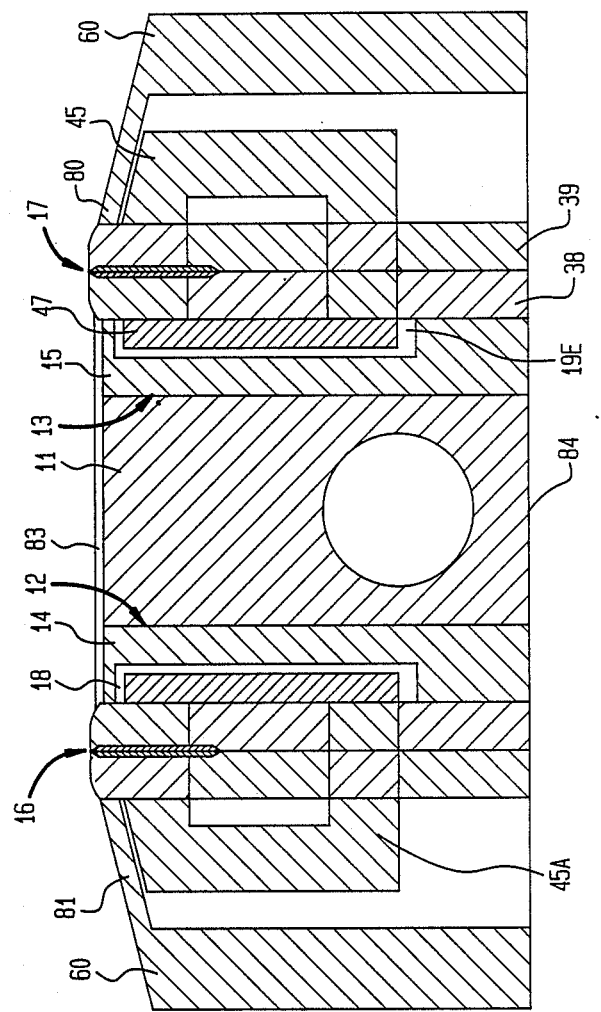
FIGS. 1 and 4 are cross-sectional views of portions of a magnetic head assembly in accordance with this invention.

FIG. 1 shows a cross-section of a magnetic head assembly 10 in accordance with this invention. The assembly includes first and second magnetic heads each comprising a pair of abutting wafers. Specifically, the assembly comprises a support member 11 comprising a ferrite block. Member 11 comprises first and second faces 12 and 13 to which electrically conducting members 14 and 15 are attached respectively.

Conducting members 14 and 15 are adapted to receive first and second magnetic heads (16 and 17). To this end, members 14 and 15 include recesses 18 and 19 adapted to receive the heads as will become clear hereinafter.

Each magnetic head is defined by a pair of abrasion-resistive wafers made, for example, of calcium titanate or equivalent material. The wafers are sliced from a block of calcium titanate 20 of FIG. 2. One such wafer is designated 21 in FIG. 2. Prior to separation of the block into wafers, first and second faces of the block, designated 22 and 23, are machined to include slots 24 and 25 in face 22 and slots 26 and 27 in face 23. The slots are filled with inserts of soft magnetic material 28, 29, 30, and 31 respectively, the inserts to slots 24 and 25 also being abrasion-resistive. The portion of surfaces 22 and 23 which is separated from block 20 as each wafer is sliced free is referred to hereinafter as an edge, anterior and posterior edges for surfaces 22 and 23 respectively. One material suitable as an insert in slots 24 and 25 is commonly known as Sendust and is preferably single crystal. Another suitable material is maganese zinc ferrite.

Figure 2:
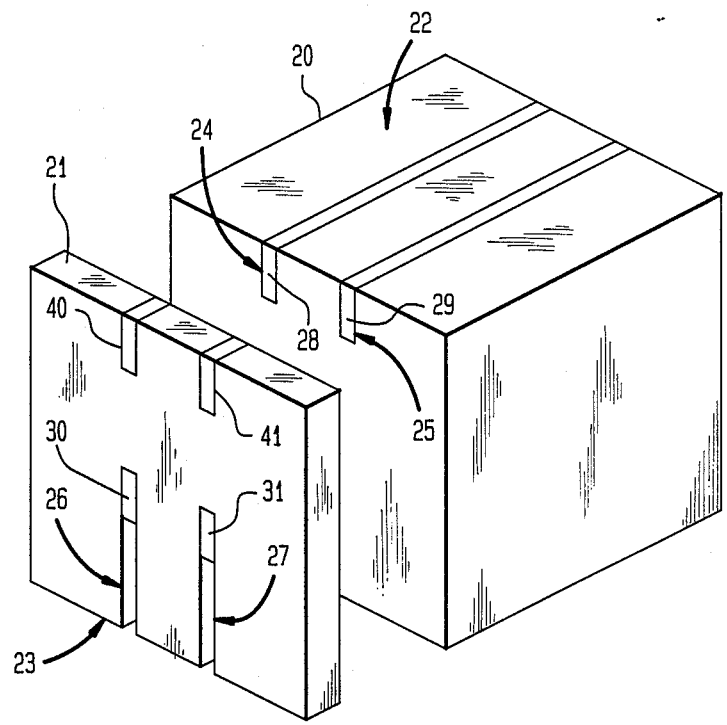
FIG. 2 is a perspective view of a portion of a magnetic head subassembly adapted for incorporation into the assembly of FIG. 1.
Figure 3:
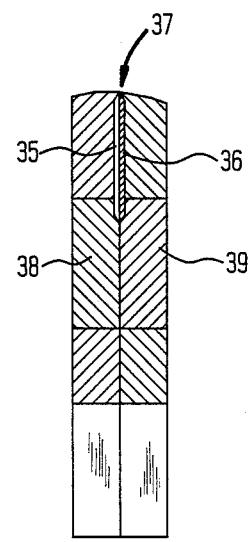
FIGS. 3 and 5 are enlarged cross-sectional views of portions of the head assembly of FIG. 1.

A magnetic head is formed by abutting the first major faces of two of these wafers (21 of FIG. 2). But before the wafer faces are abutted, a lateral trough is formed in each wafer just posterior to each anterior edge. The troughs are designated 35 and 36 in FIG. 3 and can be seen to be positioned just below the anterior edge designated 37 in FIG. 3. Also, a layer of glass of controlled thickness is sputtered onto each first surface to insure a specified separation between the inserts at the anterior edges of the two wafers when abutted. The wafers are affixed to one another by heating the glass to a temperature below the melting point but above the sticking temperature of the glass when the wafers are juxtaposed with one another. The two wafers in FIG. 3 are designated 38 and 39.

Figure 4:
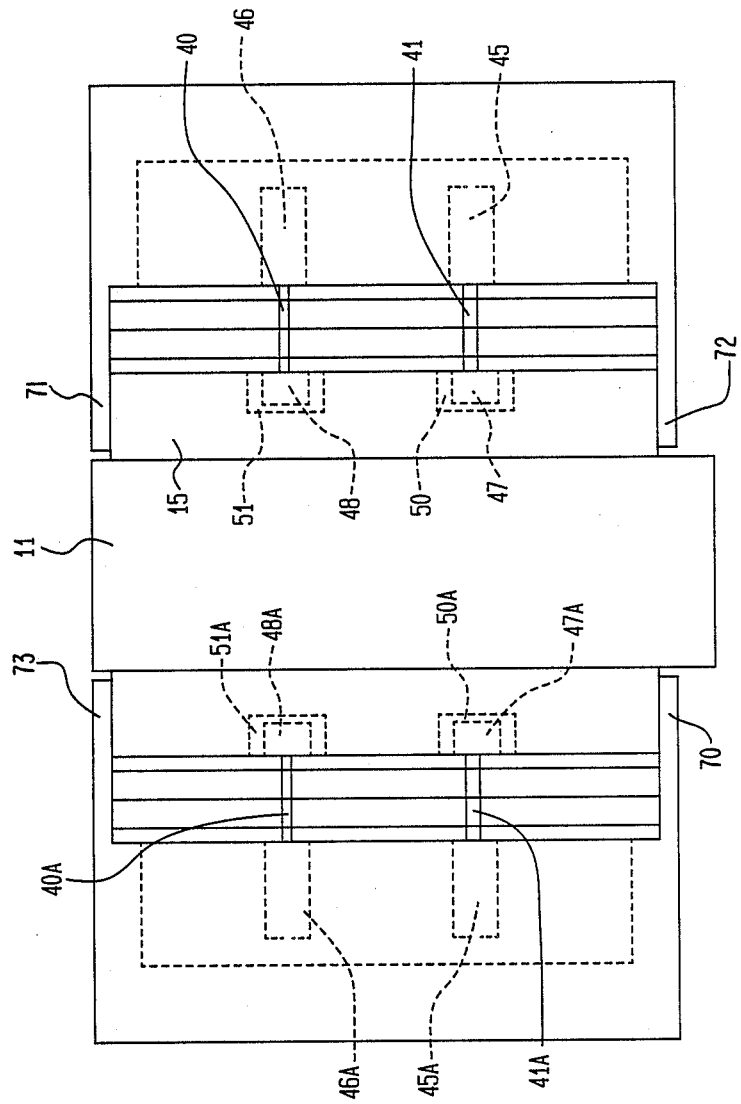

FIG. 1 shows the assembled wafer pairs of first and second magnetic heads in position in the magnetic head assembly. A wafer pair alone does not function as a magnetic head. It is necessary to provide flux closure elements between insert 40 and 30 and inserts 41 and 31 in FIG. 2 of each wafer after the wafers are provided with facing troughs, coated with glass and affixed in juxtaposition. Also it is necessary to wind a copper coil around the flux closure elements. The flux closure elements are shown in FIGS. 1 and 4. The coils are designated 43 and 43A in FIG. 1.

The wafers of each head have their first major surfaces abutting one another. The second major surfaces are facing outward. Flux closure elements 45 and 46 are of U-shaped configuration extend between inserts 41 and 31 and between 40 and 30 respectively as shown. Rectangular elements 47 and 48 similarly extend between inserts 41 and 31 and between inserts 40 and 30 respectively. Elements 47 and 48 are separated from electrically conducting element 15 by, i.e , gaps 50 and 51 of FIG. 4. The corresponding elements of the second magnetic head 51 of FIG. 4 have like designation followed by the letter A.

Figure 5:
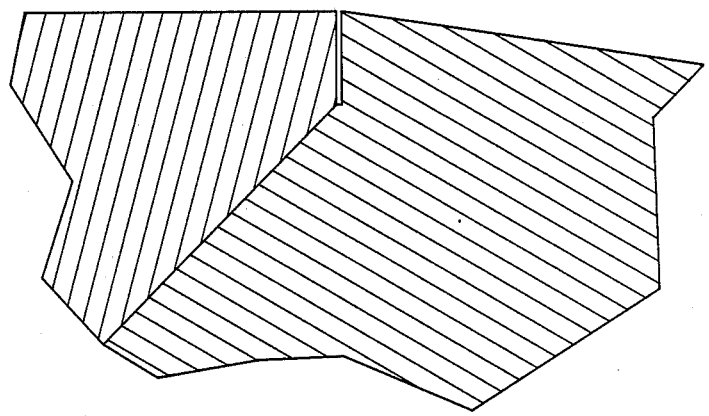

The assembly of FIG. 1 is completed by a metallic can 60. The can encompasses the entire assemblage of elements leaving only the anterior edges of the wafers exposed as shown. The can includes flanges 70, 71, 72, and 73 adapted to slip fit over the magnetic heads, bearing against support member 11 as shown in FIGS. 1 and 4. The anterior face of the can includes portions 80 and 81 which extend over the flux closure element (i.e., 45) and abutting the anterior edges of the wafers (see FIGS. 1 and 3). The can also includes a portion 83 which overlies support member 11 and electrically conducting members 14 and 15, occupying the entire space between the exposed anterior edges of the wafers of the heads. The can also includes a lid 84 (of FIG. 1) sealing the posterior portion of the can. The details of each magnetic head at the air gap where the wafer meet at the anterior edges thereof are shown in FIG. 5. The dimensions of the pole depth and the air gap are given as 0.001/0.002 inch and 30 microinches respectively. The spacing between heads is 0.300 inch as shown in FIG. 1. The separation between inserts in a wafer is shown to be 0.105 inch in FIG. 4, easily obtained by state of the art glass sputtering techniques mentioned above.

A magnetic head adapted for the assembly of FIG. 1 is made by the following process:

A block of abrasion-resistive material having opposed first and second faces is machined to provide a pair of parallel slots in each of the opposed faces. A rectangular insert of magnetically soft material is placed in each slot and secured in place. The material in the slots at said first face also being highly resistive to abrasion. The block is then sliced along a plane parallel to its ends as shown in FIG. 2. A trough is cut below the anterior edges of each wafer as shown in FIG. 3. A glass coating is then sputtered onto the surface of each wafer. A pair of wafers are juxtaposed, with troughs facing one another and the assembly is heated to below the melting point and above the sticking point of the glass to define the air gap as shown in FIG. 5. Rectangular and U-shaped flux closure elements are thereafter secured to the exposed faces of the wafers to bridge the space between associated inserts as shown in FIG. 1.

The assembly of FIG. 1 is adapted to maintain the azimuth (the degree to which a first and a second head are parallel to one another) within strict tolerances. If the left and right heads as viewed in FIG. 1 are taken as the write heads for a pair of write-after-read tracks, the azimuth can be seen to be maintained easily within 10 sec of arc by cutting the major surfaces of relatively large elements (i.e., the wafers, block 11 and elements 14 and 15) properly, a procedure easily accomplished with existing machining techniques. Moreover, only the inserts in the various slots herein need to be of expensive material. Thus, the amount of such material is minimized. The abrasion resistive material of the wafers is chosen to wear faster than the inserts at the anterior edges in order to employ normal wear to enhance performance by increasing the area of exposed insert material in time.

Cross feed between a write and a read head on the same track also is eliminated by the arrangement of FIG. 1. Can 60 is of a geometry and electrically connected to the copper shield of support 11 such that a one turn coil, of low resistance, is formed about the read head and about the corresponding write head. This one turn coil opposes external flux generated by the write head and the second one turn coil suppresses only external flux in the neighborhood of the opposing read head.

I claim:

1. A magnetic head assembly comprising first and second wafers of abrasion resistive material, each of said wafers having first and second major faces and anterior and posterior edges, each of said wafers including first and second slots extending inwardly from each of said anterior and posterior edges and extending from said first to said second major faces, like numbered ones of said slots being aligned with one another, respective opposing slots in said first and second wafers also being in alignment, each of said slots including magnetically soft material, said material in said first and second slots at said interior edge extending to said anterior edge and also being abrasion-resistive, each of said faces of said first and second wafers including lateral troughs extending laterally across said slots, a glass layer between said first faces, said first faces being juxtaposed with respect to one another, the anterior edges thereof being separated by said glass layer, first and second flux closure elements abutting opposing second faces and extending between magnetically soft material filling respective ones of said opposing slots for forming flux closure paths therebetween.

2. A magnetic head assembly of claim 1 also including a block of ferrite material having first and second parallel major surfaces, first and second conductive members secured to said first and second surfaces respectively, each of said members having an outwardly facing surface, each of said outwardly facing surfaces including a recess for receiving said first flux closure elements and being fixed to a second face of one of said first and second wafers.

3. A magnetic head assembly in accordance with claim 2 also including a conductive metal can adapted to be secured about said wafers and connected to said conductive metal members in a manner to leave only the anterior edge of said wafers exposed.

4. A magnetic head including juxtaposed first and second wafers of abrasion resistive material, each of said wafers having first and second major faces and anterior and posterior edges, said first faces being opposed to one another, a glass layer between said first faces, said layer having a thickness to form an air gap between said wafer at said anterior edges, each of said first and second wafers having a first pair of first and second slots and extending from said first to said second major faces in opposing aligned positions extending inwardly from each of said anterior and posterior edges, said slots including inserts of magnetically soft abrasion-resistive material, said material in said slots at said anterior edges intersecting said respective anterior edge, and flux closure elements magnetically connecting magnetically soft, abrasion-resistive inserts in respective slots at said anterior and posterior edges, said inserts at said anterior edges being of a material which is more resistive to abrasion than that of said wafers.

5. A magnetic head in accordance with claim 4 wherein each of said wafers has first and second major faces, each of said wafers having a lateral trough therein at said first face just posterior to said first edge and intersecting said insert in a manner to reduce the width thereof.

6. A magnetic head in accordance with claim 5 wherein said first surfaces include a glass layer of a first thickness therebetween and said first surfaces are abutting against one another and affixed thereto to form an air gap therebetween.

7. A magnetic head in accordance with claim 6 wherein each of said wafers includes a second pair of first and second slots extending inwardly from said first and second edges respectively and positioned parallel to and spaced apart from said first and second slots of said first pair, an insert fixed within each slot of said second pair said insert in said first slot of said second pair extending to said first edge, said insert in said first slot of said second pair comprising a magnetically soft abrasion-resistive material, said troughs extending along the first faces of the respective wafers in a manner such that the width of the insert within each of said first slots is reduced.

8. A magnetic head in accordance with claim 7 also including flux closure elements extending between respective inserts of a pair and operative to provide a flux closure path therebetween in each instance.

9. A magnetic head in accordance with claim 8 wherein ones of said flux closure elements are positioned adjacent said second major surfaces and comprise magnetic material of U-shaped geometry having first and second ends affixed to inserts in respective slots of said pairs.

* * * * *